(12) United States Patent
Kaneda et al.

(10) Patent No.: US 6,285,691 B1
(45) Date of Patent: Sep. 4, 2001

(54) LASER LIGHT GENERATING METHOD AND APPARATUS

(75) Inventors: Yushi Kaneda; Yutaka Imai; Takeshi Kaneko; Tsutomu Sakashita, all of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/292,654

(22) Filed: Apr. 15, 1999

(30) Foreign Application Priority Data

May 1, 1998 (JP) .................................................. 10-122156

(51) Int. Cl.$^7$ ........................................................ H01S 3/00
(52) U.S. Cl. ................................ 372/33; 372/33; 372/22; 372/26; 372/18; 372/19
(58) Field of Search .................................... 372/33, 29.01, 372/18, 19, 31, 32, 22, 21, 26

(56) References Cited

PUBLICATIONS

"The Tab electronics guide to understanding electricity and electronics", G. Randy Slone, 1995, pp. 225–226, 267, 309–3313.*

A. Ashkin et al., "Resonant Optical Second Harmonic Generation and Mixing," IEEE Journal of Quantum Electronics, vol. QE–2, No. 6, Jun. 1966, pp. 109–124.

E. Cheng et al., "High–Power Single–Mode Diode–Pumped ND:YAG Laser Using a Monolithic Nonplanar Ring Resonator," Optical Society of America, Optics Letters, vol. 16, No. 7, Apr. 1, 1991, pp. 478–480.

D. Gerstenberger et al., "Efficient Second–Harmonic Conversion of CW Single–Frequency ND:YAG Laser Light by Frequency Locking to a Monolithic Ring Frequency Doubler," Optical Society of America, Optics Letters, vol. 16, No. 13, Jul. 1, 1991, pp. 992–994.

W. Kozlovsky et al., "Efficient Second Harmonic Generation of a Diode–Laser–Pumped CW ND:YAG Laser Using Monolithic MGO:LINBO3 External Resonant Cavities," IEEE Journal of Quantum Electronics, vol. 24, No. 6, Jun. 1988, pp. 913–919.

Z. Ou et al., "85% Efficiency for CW Frequency Doubling from 1.08 to 0.54 uM," Optical Society of America, Optics Letters, vol. 17, No. 9, May 1, 1992, pp. 640–642.

* cited by examiner

Primary Examiner—Frank G. Font
Assistant Examiner—Delma R. Flores Ruiz
(74) Attorney, Agent, or Firm—Oblon, Spivak, McClelland, Maier & Neustadt, P.C.

(57) ABSTRACT

A laser generating apparatus has a plurality of laser resonators and control loops for generating frequency locking signals independently for the respective laser resonators. A control signal generation circuit is provided so as to be common to the control loops. Control signals generated by the control signal generation circuit by frequency division are supplied to the respective control loops, whereby the phases of the laser resonators are locked to each other.

16 Claims, 3 Drawing Sheets

PRIOR ART FIG. 1

LASER LIGHT GENERATING METHOD AND APPARATUS

BACKGROUND OF THE INVENTION

1. Field of the Invention

The present invention relates to a laser light generating method and apparatus for generating laser light by locking the phases of a plurality of laser resonators to each other.

2. Description of the Related Art

The injection locking chain (refer to E. A. P. Cheng and T. J. Kane, Opt. Lett. 16, pp. 478–480 (1991)) is known as an example of laser light generating methods in which a plurality of laser resonators resonate simultaneously, that is, methods for generating laser light by locking the phases of a plurality of laser resonators to each other.

The injection locking chain will be described below with reference to FIG. 1.

In the injection locking method, a small-size laser is used as a master laser 1 and laser light emitted from the master laser 1 is guided by a mirror 2, an electro-optic modulator 3, and a mirror 4 to a large-size slave laser (slave resonator) 22 that is composed of a precision positioning mirror 10 as a resonator optical path length control means and mirrors 5, 7, and 9, whereby the laser light is amplified at a large gain without losing coherence.

In doing frequency locking in the slave resonator 22, locking should be made to the frequency of the master laser light by precisely controlling the resonator optical path length of the slave resonator 22. That is, the frequency in the resonator 22 is locked by a control loop that consists of a frequency supplying circuit (phase modulation signal oscillation circuit) 30 for supplying a phase modulation signal to the electro-optic modulator 3, a photodetector 32 for detecting, as a phase detection signal, part of laser light exiting from the resonator 22, and a mixer 31 for supplying a control signal (error signal or positioning signal) to the precision positioning mirror 10 by synchronously detecting the phase detection signal and the phase modulation signal.

As described above, the FM side band method is used as a frequency locking method. That is, the electro-optic modulator 3 as a phase modulation element is disposed in the optical path before the slave resonator 22 and frequency locking is performed by feeding back, as an error signal, a signal obtained by synchronously detecting the phase modulation signal for the electro-optic modulator 3 and return light from the slave resonator 22 to the precision positioning element 10 that is disposed in the resonator 22.

The injection locking chain is a method for increasing the laser light output power by arranging, in series, a plurality of such slave resonators (slave resonators 22 and 23) that operate according to the injection locking method. In this case, each slave resonator has an independent control loop according to the FM side band method and each electro-optic modulator is disposed on the optical path before the associated slave resonator. In the injection locking chain, it is necessary to cause the plurality of laser resonators to resonate simultaneously.

Laser light generating apparatuses that produce short-wavelength laser light by performing stepwise nonlinear wavelength conversion are known as other examples of laser light generating apparatuses in which a plurality of resonators resonate simultaneously (refer to A. Ashkin, G. D. Boyd, and J. M. Dziedzic, "Resonant optical second harmonic generation and mixing," IEEE J. Quantum Electron. QE-2, pp. 109–124 (1966); W. J. Kozlovsky, C. D. Nabors, and R. L. Byer, "Efficient second-harmonic generation of a diode-laser-pumped CW Nd:YAG laser using monolithic MgO:LiNbO$_3$ external resonant cavities," IEEE J. Quantum Electron. QE-24, pp. 913–919 (1988); and D. C. Gerstenberger, G. E. Tye and R. W. Wallace, "Efficient second-harmonic conversion of cw single-frequency Nd:YAG laser light by frequency locking to a monolithic ring frequency doubler," Opt. Lett. 16, pp. 992–994 (1991)).

A method using an external resonator is known as a method for performing nonlinear wavelength conversion efficiently (refer to Z. Y. Ou, S. F. Pereira, E. S. Polzik, and H. J. Kimble, 17, pp. 640–642 (1992)). By using resonance of an external resonator, the nonlinear wavelength conversion efficiency can greatly be increased because of confinement of fundamental-wave laser light in the laser resonator. To cause the external resonator to resonate with fundamental-wave laser light, a precision positioning element in the resonator is controlled by using an FM side band method that is similar to the one used in the injection locking method.

A fourth harmonic wave with respect to fundamental-wave laser light can be generated by further wavelength-converting, by utilizing a nonlinear optical effect, a second harmonic wave generated in the above manner by SHG (Second Harmonic Generation). In this case, the wavelength shortening can be attained efficiently if the nonlinear wavelength conversion is performed by using an external resonator as in the case of the second harmonic generation process. Also in this short-wavelength laser light generation by the stepwise nonlinear wavelength conversion, it is necessary to cause a plurality of resonators to resonate simultaneously.

It goes without saying that it is necessary to cause a plurality of resonators to resonate simultaneously also in a laser light generating apparatus in which the above-described injection locking laser and nonlinear wavelength conversion process are combined.

As described above, in the laser light generating methods for generating laser light by causing a plurality of laser resonators to resonate simultaneously and establishing a phase-locked condition, control circuits are constructed independently for the control loops for controlling the resonator lengths of the laser resonators and the frequencies of phase modulation signals in all the control loops are set different from each other.

However, where phase modulation signals of the same frequency generated in a plurality of signal oscillation circuits are used simultaneously in different control loops, there may occur a case that a modulation signal in an upstream stage is mixed into an error signal in a downstream stage to disable a normal control. Further, where phase modulation signals generated by a single signal generation circuit are used in different control loops simultaneously, there may occur a case that an error signal cannot be generated correctly in a downstream loop. Still further, there may occur a case that beats of a plurality of non-lockable frequencies occur in accordance with the number of signal oscillators and hence undesired emission increases.

Usually, the Pound-Drever method (FM side band method) is used for high-precision control (locking) of a laser resonator. In the Pound-Drever method, an error signal having a bandwidth approximately equal to the control frequency bandwidth of an actuator for controlling the resonator length is generated from a phase signal of the resonator by double frequency down-conversion of "generation of a beat signal by a heterodyne method using a phase modulator (100 THz signal→100 MHz signal)" and "synchronous detection (10 MHz signal→1 kHz signal), " whereby positional accuracy of about 100 THz (i.e., accuracy of the wavelength or lower) is secured. (The "generation of a beat signal by the heterodyne method" is also a kind of synchronous detection.)

Where a plurality of resonators are controlled by signals of the same frequency that are generated by different signal oscillators, there may occur a case that a signal caused by a phase variation in an upstream resonator is mixed into a signal in a downstream resonator to make it difficult to perform a high-precision control. Also where a plurality of resonators are controlled by phase signals generated by the same signal oscillator, there may occur a case that a temporal deviation between signal inputs to an upstream resonator and a downstream resonator causes a phase variation between the resonators to prevent correct generation of error signals as in the above example.

Further, in constructing an actual circuit, high-frequency noise components in the circuit and low-frequency noise as a beat of the high-frequency noise components may act as noise (e.g., digital noise (undesired emission) in a digital circuit) that adversely affects the circuit itself. In general, using a plurality of clock generators in the same circuit is not desirable because of generation of noise of the above kind.

Where a plurality of different signal oscillation circuits are used, such circuit parts as a frequency oscillator and a frequency divider and an amplifier for the frequency oscillator are necessary for each signal oscillation circuit and hence a large circuit board mounting area is required. In particular, a plurality of signal oscillators are needed to control a plurality of resonators simultaneously but it is difficult to implement necessary circuits on the same circuit board.

That is, in constructing a control system of a laser light generating apparatus in which a plurality of laser resonators need to be controlled simultaneously, it is difficult to implement a phase modulation signal oscillator portion on the same circuit board in a compact manner.

SUMMARY OF THE INVENTION

The present invention has been made in view of the above circumstances, and an object of the invention is therefore to provide a laser light generating method and apparatus which can normally lock (control) the phases of laser resonators by using a simple configuration.

The invention provides a laser light generating method (hereinafter referred to as the laser light generating method of the invention) in a laser light generating apparatus comprising a plurality of laser resonators each having a controllable resonator optical path length, and a plurality of control loops for generating frequency locking signals independently for the respective laser resonators, the laser light generating method comprising the steps of providing a control signal generation circuit so that it is common to the plurality of control loops; and causing the control signal generating circuit to generate control signals by frequency division, and supplying the generated control signals to the respective control loops, to thereby lock phases of the respective laser resonators each other and generate laser light.

In the laser light generating method of the invention, in generating prescribed laser light by locking the phases of a plurality of laser resonators to each other, the control signal generation circuit is provided so as to be common to the control loops and the phases of the laser resonators are locked to each other by supplying the respective control loops with control signals generated by the control signal generation circuit by frequency division. Therefore, a control signal in one laser resonator is not mixed into another laser resonator and hence it becomes possible to normally control the phase locking among the laser resonators, that is, the resonance of the laser resonators. This control can be realized by a simple configuration.

In the laser light generating method of the invention, the term "frequency division" means generating, as control signals to be supplied to the control loops, output signals having frequencies (m/n)f (m and n are integers that are greater than or equal to 2 and are relatively prime) that are synchronized with an input signal having a frequency f (this definition will be employed in the following description consistently). The means for performing the frequency division may be ordinary ones such as means utilizing clock counter frequency division in a digital circuit, means utilizing a locking phenomenon of an oscillator, feedback frequency division, automatic control, a multivibrator, and a blocking oscillator. In the laser light generating method of the invention, in particular, it is desirable that control signals generated by the control signal generation circuit by frequency division have frequencies that are not an integral multiple of each other.

The invention also provides, as an apparatus for practicing the laser light generating method of the invention with high reproducibility, a laser light generating apparatus (hereinafter referred to as the laser light generating apparatus of the invention) comprising a plurality of laser resonators each having controllable resonator optical path length; a plurality of control loops for generating frequency locking signals independently for the respective laser resonators; and a control signal generation circuit common to the plurality of control loops, for generating control signals by frequency division and supplying the generated control signals to the respective control loops, whereby phases of the respective laser resonators are locked to each other.

The laser light generating apparatus of the invention, which is an apparatus for generating prescribed laser light by locking the phases of a plurality of laser resonators to each other, has the control signal generation circuit common to the control loops. The phases of the laser resonators are locked to each other by supplying the respective control loops with control signals generated by the control signal generation circuit by frequency division. Therefore, a control signal in one laser resonator is not mixed into another laser resonator and hence it becomes possible to normally control the phase locking among the laser resonators, that is, the resonance of the laser resonators. This control can be realized by a simple apparatus configuration.

DESCRIPTION OF THE PREFERRED EMBODIMENTS

Figure 1:
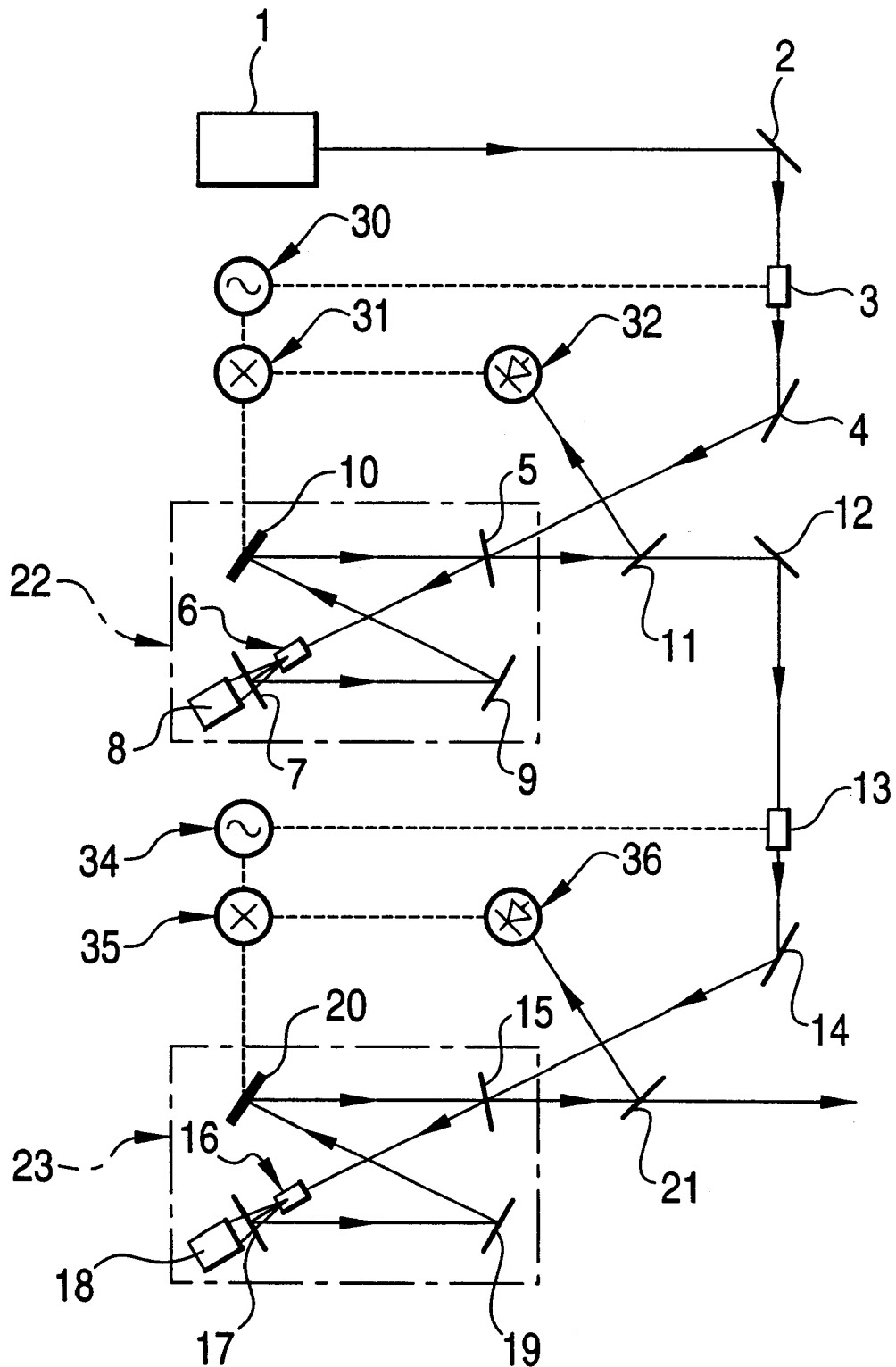
FIG. 1 shows a general configuration of a conventional laser light generating apparatus (injection locking chain)

In the laser light generating method and apparatus of the present invention, a phase modulation element for modulating the phase of laser light is disposed before each of the positions where the laser light is input to respective laser resonators. And the resonator optical path length is controlled by feeding back, as an error signal, a synchronous detection signal of a phase modulation signal supplied to the phase modulation element and a phase detection signal obtained from the associated laser resonator to a resonator optical path length control means in the associated laser resonator.

That is, the phase modulation element is disposed before the associated laser resonator, a synchronous detection signal is obtained by performing calculation, with a mixer, for example, on a phase modulation signal supplied to the phase modulation element to modulate the phase of the laser light and a phase detection signal obtained from the associated laser resonator, and the synchronous detection signal is fed back, as an error signal, to the control means for controlling the resonator optical path length of the associated laser resonator. The frequency locking in each laser resonator is realized in this manner (FM side band method).

In the invention, a control signal generated by a control signal generation circuit by frequency division can be input to a phase modulation signal oscillation circuit for generating a phase modulation signal, and then the phase modulation signal generated by the phase modulation signal oscillation circuit can be input to the phase modulation element. In the control loop that performs frequency locking of the laser resonator, the phase modulation signal supplied from the phase modulation signal oscillation circuit and a phase detection signal obtained by detecting the phase of laser light exiting from the laser resonator are subjected to mixing (in particular, synchronous detection), and a resulting signal can be fed back to the resonator optical path length control means as an error signal (positioning signal).

The phase detection signal can be obtained from return light or transmission light from the laser oscillator.

In the invention, as described above, the control loop for performing the frequency locking of each laser resonator is composed of the following three main circuits:

(1) the phase modulation signal oscillation circuit for supplying a phase modulation signal to the phase modulation element;

(2) the photodetecting circuit for detecting return light or transmission light from the laser resonator and outputs a resulting phase detection signal; and (3) the mixing circuit for performing calculation (synchronous detection) on the phase modulation signal and the phase detection signal, and supplying a resonator optical path length control signal (error signal or error adjustment signal) to the resonator optical path length control means in the laser resonator based on a calculation result.

Further, the control signal generation circuit, which is common to the control loops, supplies prescribed control signals to the respective phase modulation signal oscillation circuits. In this manner, the frequency locking in each laser resonator and the phase locking among the laser resonators are controlled normally with a simple circuit configuration.

The phase modulation element may be an electro-optic modulator (EOM). Other phase modulation elements (e.g., an acousto-optic modulator) may also be used.

Although such frequency dividing means as means utilizing clock counter frequency division in a digital circuit generate a rectangular-wave signal, it can be converted to a sinusoidal-wave signal by inserting a low-pass filter before the phase modulation element. However, it is difficult to completely eliminate multiple frequency components. If the modulation frequencies $f_1$ and $f_2$ of two laser resonators satisfy a relationship $f_1=mf_2$ where m is an integer and signals are generated by the same signal generator by frequency division, there may occur a case that a multiple frequency signal component adversely affects the locking (phase locking) among the laser resonators.

Therefore, in the invention, it is desirable that the control signals generated by the control signal generation circuit by frequency division have frequencies that are not an integral multiple of each other. That is, the control signal generation circuit is provided so as to be common to the laser resonators, and signals having such a frequency ratio that the frequencies are not an integral multiple of each other are generated by frequency division and allocated to the respective control loops as control objects. As a result, mixing of a control signal for one laser resonator into another laser resonator can be avoided and hence the phase locking among the laser resonators can be controlled normally.

In the invention, it is desirable that the laser resonators be amplifiers for amplifying laser light emitted from a laser light source. Alternatively, the laser resonators may be waveform converters for performing nonlinear wavelength conversion on laser light emitted from a laser light source.

Preferred embodiments of the invention will be hereinafter described.

Figure 2:
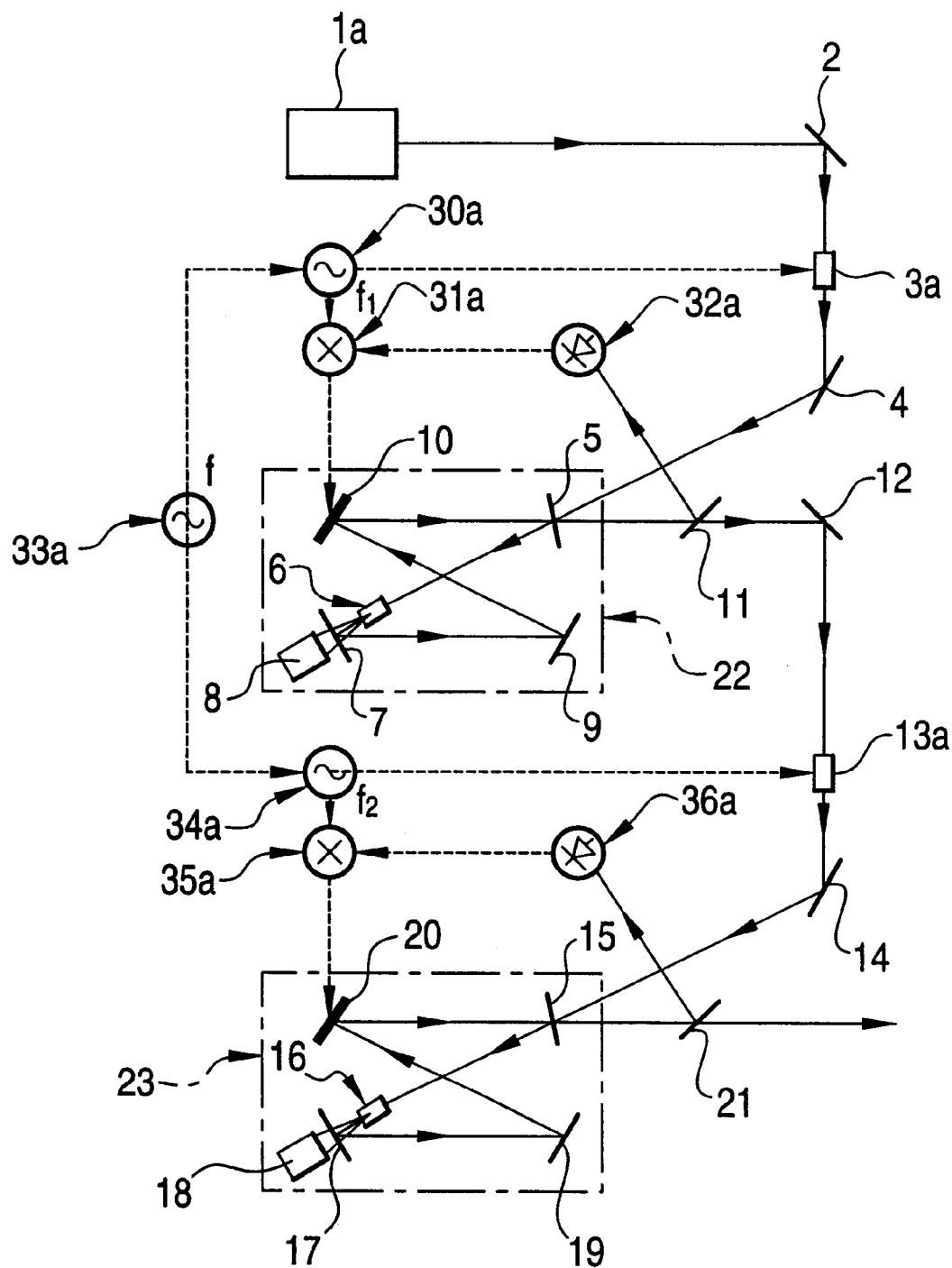
FIG. 2 shows a general configuration of a laser light generating apparatus according to a first embodiment of the present invention.

As shown in FIG. 2, a first embodiment is directed to an injection locking laser (amplifier) using a Nd:YAG crystal.

Laser light emitted from a master laser 1a (e.g., a Nd:YAG laser) is input, by using path-folding mirrors 2 and 4, to a slave laser-A (slave resonator) 22 that is composed of a resonator optical path length positioning mirror (resonator optical path length control element) 10 and in-plane path-folding mirrors 5, 7, and 9. While the mirror 9 is a full-reflection mirror, the mirrors 5 and 7 are a half mirror or a wavelength-selective mirror.

A Nd:YAG crystal 6, for example, as a laser medium is provided in the slave resonator 22. Laser light emitted from the master laser 1a is amplified by illuminating the Nd:YAG crystal 6 with pumping laser light that is emitted from a pumping semiconductor laser 8.

An electro-optic phase modulator (EOM) 3a as a phase modulation element for the above-mentioned FM side band method is disposed on the optical path of laser light incident on the slave resonator 22.

Laser light exiting from the slave resonator 22 and laser light reflected by the in-plane path-folding mirror 5 are partially reflected by a half mirror 11, and then detected by a photodetector 32a and thereby converted to a phase detection signal that reflects the phase of the laser light exiting from the resonator 22.

In the first control loop for performing frequency locking of the slave resonator 22, an error adjustment signal is supplied to the resonator optical path length positioning element (full-reflection mirror) 10 by synchronously detecting, with a mixer 31a, a signal that is supplied from a modulation signal oscillator 30a to the electro-optic phase modulator 3a based on the information detected by the photodetector 32a.

The laser light exiting from the slave resonator 22 is input, via path-folding mirrors 12 and 14, to a slave laser-B (slave resonator) 23 that is composed of a resonator optical path length positioning element 20 and in-plane path-folding mirrors 15, 17, and 19. While the mirror 19 is a full-reflection mirror, the mirrors 15 and 17 are a half mirror or a wavelength-selective mirror.

A Nd:YAG crystal 16, for example, as a laser medium is provided in the slave resonator 23. Laser light exiting from the slave resonator 22 is further amplified by illuminating the Nd:YAG crystal 16 with pumping laser light that is emitted from a pumping semiconductor laser 18.

An electro-optic phase modulator (EOM) 13a as a phase modulation element for the above-mentioned FM side band method is disposed on the optical path of laser light that is input from the slave resonator 22 to the slave resonator 23.

Laser light exiting from the slave resonator 23 and laser light reflected by the in-plane path-folding mirror 15 is partially reflected by a half mirror 21, and then detected by a photodetector 36a and thereby converted to a phase detection signal that reflects the phase of the laser light exiting from the resonator 23.

In the second control loop for performing frequency locking of the slave resonator 23, an error adjustment signal is supplied to the resonator optical path length positioning element (full-reflection mirror) 20 by synchronously detecting, with a mixer 35a, a signal that is supplied from a modulation signal oscillator 34a to the electro-optic phase modulator 13a based on the information detected by the photodetector 36a.

The modulation signals (control signals) that are supplied from the signal oscillators (phase modulation signal oscillation circuits) 30a and 34a to the electro-optic phase modulators 3a and 13a, respectively, are generated by a signal oscillator (control signal generation circuit) 33a that is common to the two control loops without using separate signal oscillators. For example, an input signal having a particular frequency f is converted, by frequency division, to an output signal having a frequency (m/n)f (m and n are integers that are greater than or equal to 2 and are relatively prime), which is supplied to the two control loops.

In other words, with $f_1$ and $f_2$ representing the frequencies of the control signals supplied from the signal oscillator 33a to the first control loop and the second control loop, respectively, it is desirable that the frequencies $f_1$ and $f_2$ generated by the signal oscillator 33a be so set as to be different from each other and as not to be an integral multiple of each other. For example, if the frequency of the original signal is represented by f, the frequencies $f_1$ and $f_2$ are so set as to satisfy $$f_1 = (3/5)f$$

$$f_2 = (4/5)f.$$

As described above, according to the first embodiment of the invention, the control signal generation circuit is provided that is common to the control loops that perform frequency locking of the respective slave resonators and control signals generated by the control signal generation circuit by frequency division are supplied to the respective control loops. Therefore, a normal locking control can be performed while the phases of the respective slave resonators are locked to each other, that is, the slave resonators are caused to resonate simultaneously. As a result, the laser light amplification using a plurality of slave resonators can be performed efficiently.

Figure 3:
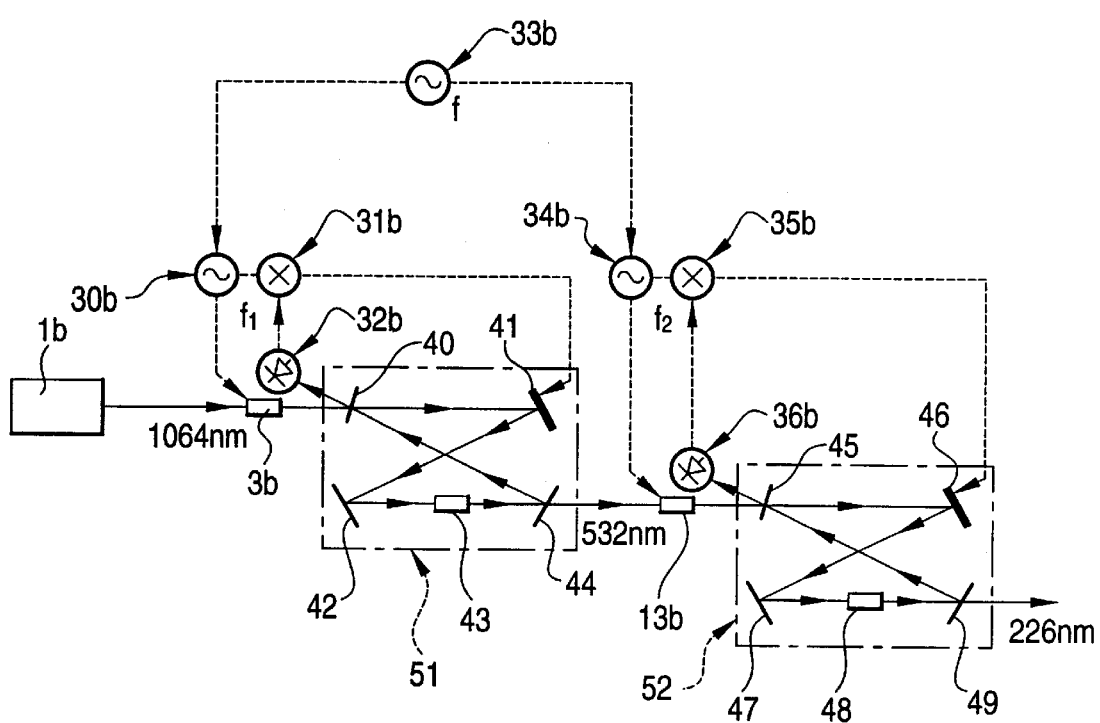
FIG. 3 shows a general configuration of a laser light generating apparatus according to a second embodiment of the invention.

As shown in FIG. 3, a second embodiment is directed to a stepwise nonlinear wavelength conversion process that employs laser light emitted from a Nd:YAG laser as a fundamental-wave laser light and that consists of a second harmonic generation step using a LBO (lithium borate) crystal and a fourth harmonic generation process using a BBO (β-barium borate) crystal.

Fundamental-wave laser light (wavelength: 1,064 nm) emitted from a Nd:YAG fundamental-wave laser 1b is input to an external resonator-A (second harmonic generation process section) 51 that is composed of a resonator optical path length positioning mirror 41 as a resonator optical path length control means and in-plane path-folding mirrors 40, 42, and 44. While the mirror 42 is a full-reflection mirror, the mirror 40 is a half mirror (or a wavelength-selective mirror) and the mirror 44 is a wavelength-selective mirror.

A nonlinear optical crystal (LBO crystal) 43 is provided in the second harmonic generation process section 51. In passing through the LBO crystal 43, the fundamental-wave laser light (wavelength: 1,064 nm) emitted from the Nd:YAG fundamental-wave laser 1b, for example, is subjected to wavelength conversion by the nonlinear optical effect, whereby a second harmonic wave (wavelength: 532 nm) is generated.

An electro-optic phase modulator (EOM) 3b as a phase modulation element for the FM side band method is disposed on the optical path of the laser light (fundamental-wave laser light) incident on the second harmonic generation process section 51.

The fundamental-wave laser light entering the second harmonic generation process section 51 is partially reflected by the half mirror 40. The reflected part of the fundamental-wave laser light and laser light passing through the half mirror 40 are detected by a photodetector 32b and thereby converted to a phase detection signal that reflects the phase of the laser light exiting from the second harmonic generation process section 51.

In the first control loop for performing frequency locking in the second harmonic generation process, an error adjustment signal to be supplied to the resonator optical path length positioning mirror (full-reflection mirror) 41 is obtained by synchronously detecting, with a mixer 31b, a signal that is supplied from a modulation signal oscillator 30b to the electro-optic phase modulator 3b based on the information detected by the photodetector 32b.

Laser light (second harmonic wave) exiting from the second harmonic generation process section 51 is input to an external resonator-B (fourth harmonic generation process section) 52 that is composed of a resonator optical path length positioning mirror 46 and in-plane path-folding mirrors 45, 47, and 49. While the mirrors 46 and 47 are full-reflection mirrors, the mirror 45 is a half mirror and the mirror 49 is a wavelength-selective mirror.

A nonlinear optical crystal (BBO crystal) 48 is provided in the fourth harmonic generation process section 52. In passing through the BBO crystal 48, the laser light (wavelength: 532 nm) guided from the second harmonic generation process section 51, is subjected to wavelength conversion by the nonlinear optical effect, whereby a fourth harmonic wave (wavelength: 266 nm) is generated.

An electro-optic phase modulator (EOM) 13b as a phase modulation element for the FM side band method is disposed on the optical path of the laser light (second harmonic wave) incident on the fourth harmonic generation process section 52.

The laser light entering the fourth harmonic generation process section 52 is partially reflected by the half mirror 45. The reflected part of the laser light and laser light passing through the half mirror 45 are detected by a photodetector 36b and thereby converted to a phase detection signal that reflects the phase of the laser light exiting from the fourth harmonic generation process section 52.

In the second control loop for performing frequency locking in the fourth harmonic generation process, an error adjustment signal to be supplied to the resonator optical path length positioning mirror 46 is obtained by synchronously detecting, with a mixer 35b, a signal that is supplied from a modulation signal oscillator 34b to the electro-optic phase modulator 13b based on the information detected by the photodetector 36b.

The modulation signals (control signals) that are supplied from the signal oscillators (phase modulation signal oscillation circuits) 30b and 34b to the electro-optic phase modulators 3b and 13b, respectively, are generated by a signal oscillator (control signal generation circuit) 33b that is common to the two control loops without using separate signal oscillators. For example, an input signal having a particular frequency f is converted, by frequency division, to an output signal having a frequency (m/n)f (m and n are integers that are greater than or equal to 2 and are relatively prime), which is supplied to the two control loops.

In other words, with $f_1$ and $f_2$ representing the frequencies of the control signals supplied from the signal oscillator 33b to the first control loop and the second control loop, respectively, it is desirable that the frequencies $f_1$ and $f_2$ generated by the signal oscillator 33a be so set as to be different from each other and as not to be an integral multiple of each other. For example, if the frequency of the original signal is represented by f, the frequencies $f_1$ and $f_2$ are so set as to satisfy $$f_1 = (3/5)f$$

$$f_2 = (4/5)f.$$

As described above, according to the second embodiment of the invention, the control signal generation circuit is provided that is common to the control loops that perform frequency locking of the respective laser resonators (wavelength conversion process sections) and control signals generated by the control signal generation circuit by frequency division are supplied to the respective control loops. Therefore, a normal locking control can be performed while the phases of the respective resonators for waveform conversion are locked to each other, that is, the resonators for waveform conversion are caused to resonate simultaneously. As a result, the stepwise waveform conversion can be performed efficiently.

To perform a locking control of a plurality of laser resonators, it is necessary to generate a plurality of modulation frequency signals for the respective laser resonators as in the case of the first and second embodiments. The control within the same optical path is enabled while mixing of a plurality of frequency signals is avoided by generating modulation frequency signals by utilizing division of a particular frequency according to the features of the invention.

As described above, in locking a plurality of resonators simultaneously, it is desirable that the frequency division be so performed that modulation signals therefor have frequencies that are not an integral multiple of each other. This is because when a modulation signal is generated, it is difficult to completely suppress above-mentioned components having multiple frequencies and those components may be mixed into another resonator and act as noise for an error signal of the resonator. However, where the modulation frequency of an upstream resonator is an integral multiple of that of a downstream resonator, no problem occurs even if a signal having a multiple frequency of the modulation frequency of the upstream resonator is mixed into the downstream resonator. For example, consider a case where a resonator for a fundamental wave of a Nd:YAG laser is an upstream resonator and external resonator type wavelength conversion is performed by a downstream resonator. If a condition $f_1 = mf_2$ (m: an integer greater than or equal to 2) is satisfied where $f_1$ and $f_2$ represent the frequencies of modulation signals that are input to the upstream resonator and the downstream resonator, respectively, there occurs no mixing of components having multiple frequencies of the modulation frequency of the upstream resonator because the modulation frequency of the downstream resonator is lower than that of the upstream resonator.

Although the invention has been described above by using the preferred embodiments, that is, the first and second embodiments, the invention is not limited thereto.

For example, the laser medium to be used in the slave resonators is not limited to a Nd:YAG crystal and a laser medium suitable for the oscillation wavelength of a laser light source can be used. The laser light source is not limited to the Nd:YAG solid-state laser and other various laser light sources such as other solid-state lasers, semiconductor lasers, gas lasers, and dye lasers can also be used.

As for a plurality of laser resonator used in the invention, an amplifier for amplifying laser light and a wavelength converter for performing wavelength conversion on laser light may be used in mixed form. Naturally it is possible to arrange three or more laser resonators and perform frequency locking among those resonators according to the invention.

What is claimed is:

1. A laser light generating method in a laser light generating apparatus comprising a plurality of laser resonators each having a controllable resonator optical path length, and a plurality of control loops for generating frequency locking signals independently for the respective laser resonators, the laser light generating method comprising the steps of:

providing a control signal generation circuit so that it is common to the plurality of control loops; and causing the control signal generating circuit to generate control signals by frequency division, and supplying the generated control signals to the respective control loops, to thereby lock phases of the respective laser resonators to each other and generate laser light.

2. The laser light generating method according to claim 1, further comprising the steps of:

disposing a phase modulation element for modulating a phase of laser light before each of positions where the laser light is input to the respective laser resonators; and controlling the resonator optical path length by feeding back, as an error signal, a synchronous detection signal of a phase modulation signal supplied to the phase modulation element and a phase detection signal obtained from the associated laser resonator to a resonator optical path length control means in the associated laser resonator.

3. The laser light generating method according to claim 2, wherein the resonator optical path length controlling step comprises the substeps of supplying the control signal generated by the control signal generation circuit to a phase modulation signal oscillation circuit for generating the phase modulation signal, and supplying the phase modulation signal generated by the phase modulation signal oscillation circuit to the phase modulation element.

4. The laser light generating method according to claim 2, wherein the phase detection signal is obtained from return light or transmission light from the associated laser resonator.

5. The laser light generating method according to claim 2, wherein the phase modulation element is an electro-optic modulator.

6. The laser light generating method according to claim 1, wherein the control signal generation circuit generates the control signals so that frequencies of the control signals are not an integral multiple of each other.

7. The laser light generating method according to claim 1, wherein each of the laser resonators is an amplifier for amplifying laser light emitted from a laser light source.

8. The laser light generating method according to claim 1, wherein each of the laser resonators is a wavelength converter for performing nonlinear wavelength conversion on laser light emitted from a laser light source.

9. A laser light generating apparatus comprising:
   a plurality of laser resonators each having controllable resonator optical path length;
   a plurality of control loops for generating frequency locking signals independently for the respective laser resonators; and
   a control signal generation circuit common to the plurality of control loops, for generating control signals by frequency division and supplying the generated control signals to the respective control loops, whereby phases of the respective laser resonators are locked to each other.

10. The laser light generating apparatus according to claim 9, further comprising:
    a phase modulation element disposed before each of positions where laser light is input to the respective laser resonators, for modulating a phase of the laser light;
    resonator optical path length control means provided in each of the laser resonators, for controlling an optical path length of the associated laser resonator; and
    feedback means for feeding back, as an error signal, a synchronous detection signal of a phase modulation signal supplied to the phase modulation element and a phase detection signal obtained from the associated laser resonator to the resonator optical path length control means in the associated laser resonator, whereby the resonator optical path length is controlled.

11. The laser light generating apparatus according to claim 10, wherein the feedback means comprises a phase modulation signal oscillation circuit that receives the control signal generated by the control signal generation circuit and generates the phase modulation signal that is supplied to the phase modulation element.

12. The laser light generating apparatus according to claim 10, wherein the phase detection signal is obtained from return light or transmission light from the associated laser resonator.

13. The laser light generating apparatus according to claim 10, wherein the phase modulation element is an electro-optic modulator.

14. The laser light generating apparatus according to claim 9, wherein the control signal generation circuit generates the control signals so that frequencies of the control signals are not an integral multiple of each other.

15. The laser light generating apparatus according to claim 9, wherein each of the laser resonators is an amplifier for amplifying laser light emitted from a laser light source.

16. The laser light generating apparatus according to claim 9, wherein each of the laser resonators is a wavelength converter for performing nonlinear wavelength conversion on laser light emitted from a laser light source.

* * * * *